J. H. Lyon,
Seal Lock.
No. 849. Reissued Nov. 8, 1859.
Fig. 1.
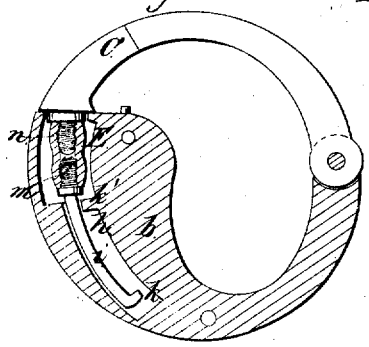
Fig. 2.
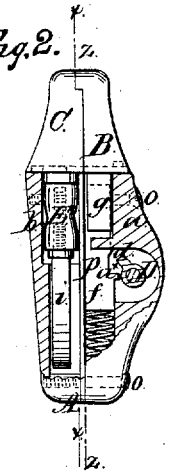
Fig. 3.
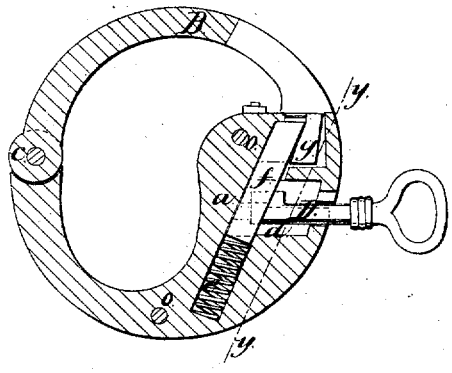
Fig. 4.
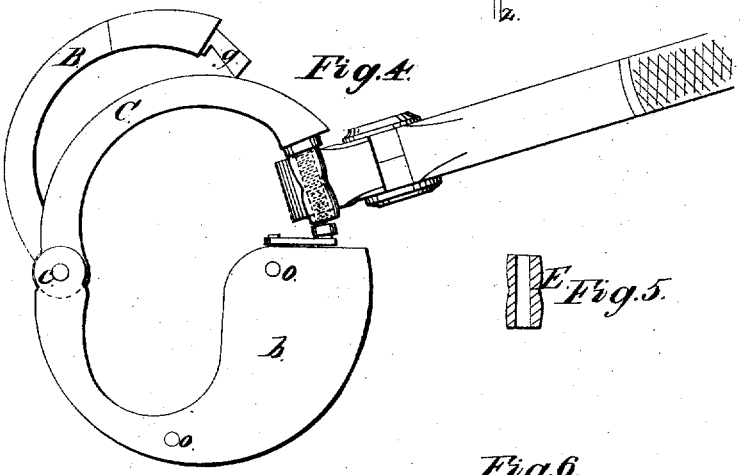
Fig. 5.
Fig. 6.
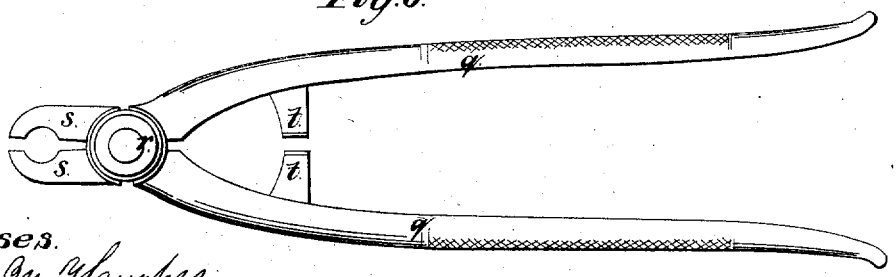
Witnesses.
Chas. M. Hughes
Mich. Hughes
Inventor.
John H. Lyon
AM. PHOTO-LITHO. CO. N.Y. (OSBORNE'S PROCESS.)

UNITED STATES PATENT OFFICE.

J. H. LYON, OF NEW YORK, N. Y.

IMPROVED LOCK AND DETECTER.

Specification forming part of Letters Patent No. 25,428, dated September 13, 1859; Reissue No. 849, dated November 8, 1859.

*To all whom it may concern:*

Be it known that I, J. H. LYON, of the city, county, and State of New York, have invented a Combined Detecter and Lock, which I term a "seal-lock"; and I do hereby declare that the following is a full, clear, and exact description of the same, reference being had to the annexed drawings, making a part of this specification, in which—

Figure 1 is a side sectional view of my invention taken in the line *x x*, Fig. 2. Fig. 2 is a front sectional view of the same taken in the line *y y*, Fig. 3. Fig. 3 is a side sectional view of the same taken in the line *z z*, Fig. 2. Fig. 4 is a side view of the same, showing the way in which the seals are adjusted. Fig. 5 is a detached sectional view of the seal. Fig. 6 is a view of the swage and nippers employed for adjusting the seal to the lock and severing the same.

Similar letters of reference indicate corresponding parts in the several figures.

This invention is designed as a safeguard against dishonest employés on railroad freight-trains and the like. The object of the invention is to attach or combine with a padlock, or any lock provided with a shackle, a seal formed of lead or other soft metal, so arranged that the seal must be broken or severed in order to open and detach the lock, the severed seal indicating that the lock has been opened.

To enable those skilled in the art to fully understand and construct my invention, I will proceed to describe it.

A represents the case of the lock, which may be of semi-annular or any proper form. This case A is formed of two parts, *a b*, precisely similar in form, and each provided with a shackle, B C, which are fitted on a common center-pin, *c*, that passes through both parts *a b* of the case at one end, and also serves as a means of connection as well as a pivot for the shackle.

The shackles B C may be of the usual bow or semicircular form, and the outer end of each passes a short distance into its part of the case, a recess or opening being made in each part *a b* for such purpose. The recess *d* in the part *a* of the case A is formed in its inner side, and in said recess a spiral spring, *e*, is placed, and also a square bar, *f*, the latter resting on the spring *e*. The spring *e* has a tendency to keep the bar *f* forced upward, and the end of the shackle B secured in the upper part of the recess *d*, (see Fig. 3,) in which it will be seen that the end of the shackle B is provided with a dovetail terminus, *g*, which is the cause of the bar *f* securing the shackle B. The bar *f* is depressed by a key, D, a recess and a lip being at the inner side of the bar *f*, the bit of the key when turned acting against the lip *a**. (See Fig. 2.)

In the recess *h* of the part *b* of the case A a short bar, *i*, is placed and allowed to work loosely. This bar, however, is prevented from passing entirely out of the recess *h* by means of a lip, *k*, on its lower end, and a stop or projection, *k'*, in the recess *h*, as shown clearly in Fig. 1. The upper part of the recess *h* above the stop or projection *k'* is larger than the lower part, in order that it may receive a lead or other soft-metal tube, E, the lower part of which is secured on a screw, *m*, at the upper end of the bar *i*. The upper part of this tube E is secured on a screw, *n*, attached to the end of the shackle C. The two parts *a b* of the case A are connected together by screws *o o*, and as the recesses *d h* are formed in the inner and adjoining sides of the parts *a b*, I place a short metal division-plate, *p*, between them, as shown in Fig. 2.

The tubes E are cast in proper quantities, and each overseer or superintendent is supplied with them, as well as with the tool shown in Fig. 6, which is formed of two handles, *q q*, curved and connected by a fulcrum-pin, *r*, and terminating in jaws *s s*, grooved transversely, so as to form a swage to grasp and compress the tubes E on the screws *m n*. At the inner side of each handle *q* a cutter, *t*, is attached, by which the tubes are divided.

The device is used as follows: When the lock is applied, both shackles B C are passed through the staple and the shackle B locked by throwing up the bar *f* by the key D. Previous, however, to locking the shackle B a tube, E, is compressed and secured on the screws *m n* of the bar *i* and shackle C, the tube fitting loosely on the screws at first, but swaged or compressed tightly on them by the jaws *s s* of the tool represented in Fig. 6, the bar *i* being allowed a requisite movement in its recess *h* to admit of its screw *m* passing out of the part *b* of the case A. When the shackle B is locked, it keeps the shackle C down to the case by means of a shoulder-lock, *u u*, as clearly shown in Fig. 2, a shoulder, *u*, being on the inner side of each shackle and so disposed that they fit over each other or overlap.

It will be seen from the above description that in order to unlock the lock the tube E must be divided, as it cannot be stripped from the screws, and this would of course indicate that the lock had been opened. If the invention be used on the freight-cars on railroads the depot-masters will be provided with tubes and a swaging-tool, so as to open the locks, and after the goods are removed apply new tubes E and relock the locks. Postmasters might also be similarly provided and the dishonesty of mail-contractors guarded against.

The form of construction above described is a very simple and economical plan, and is a more perfect detecter than if a single shackle were employed, as a person could not well adjust the tubes or seals to the device without having proper tools, those made especially for that purpose. A common device might be obtained by modifying an ordinary padlock so that a transverse pin could be passed through the lock and shackle, and having a seal at one or both ends of said transverse pin. This plan, however, would be inferior to the one previously described.

Various modifications of the plans herein described might be adopted in order to attach the seal to the lock so as to effect the desired end.

Having thus described my invention, what I claim as new, and desire to secure by Letters Patent, is—

Combining with a padlock or any lock provided with a shackle a lead or soft-metal tube or seal, so arranged as to be temporarily secured thereto, and admitting of being released only by the removing or breaking of said tube or seal, which thereby serves as a detecter, substantially as set forth.

JOHN H. LYON.

Witnesses:
DAVID I. SMITH,
THOMAS COLLINS.